(12) United States Patent
Rabe et al.

(10) Patent No.: US 10,173,617 B2
(45) Date of Patent: Jan. 8, 2019

(54) BUMPER ARRANGEMENT

(71) Applicant: BENTELER AUTOMOBILTECHNIK GMBH, Paderborn (DE)

(72) Inventors: Frank Rabe, Hiddenhausen (DE); Christian Handing, Langenberg (DE); Mirko Paare, Paderborn (DE); Elmar Mollemeier, Delbrueck (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 15/217,036

(22) Filed: Jul. 22, 2016

(65) Prior Publication Data
US 2017/0129431 A1    May 11, 2017

(30) Foreign Application Priority Data

Aug. 6, 2015   (DE) .......... 10 2015 112 935

(51) Int. Cl.
| B60R 19/20 | (2006.01) |
| B60R 19/34 | (2006.01) |
| B60R 19/02 | (2006.01) |
| B60R 19/18 | (2006.01) |

(52) U.S. Cl.
CPC ............ B60R 19/20 (2013.01); B60R 19/023 (2013.01); B60R 19/18 (2013.01); B60R 19/34 (2013.01); *B60R 2019/1806* (2013.01)

(58) Field of Classification Search
CPC ....... B60R 19/20; B60R 19/34; B60R 19/023; B60R 19/18; B60R 2019/1806
See application file for complete search history.

(56) References Cited

U.S. PATENT DOCUMENTS

| 3,829,141 A * | 8/1974 | Igwe ....................... B60R 19/20 267/140 |
| 5,673,767 A * | 10/1997 | Uno ........................ B62D 33/06 180/89.12 |
| 8,505,990 B2 * | 8/2013 | Czopek ................... B60R 19/18 293/102 |
| 2011/0049915 A1 * | 3/2011 | Kokubo ................. B21D 53/88 293/132 |

(Continued)

FOREIGN PATENT DOCUMENTS

| DE | 33 42 332 A1 | 6/1984 |
| DE | 195 46 332 A1 | 8/1997 |
| DE | 196 10 143 A1 | 9/1997 |

(Continued)

*Primary Examiner* — D Glenn Dayoan
*Assistant Examiner* — Melissa A Black
(74) *Attorney, Agent, or Firm* — Sheridan Ross P.C.

(57) ABSTRACT

The invention relates to a bumper arrangement with a crossmember and two crashboxes which are in each case connectable on one side to the crossmember on an outer region thereof and are arrangeable on the other side on a vehicle-side longitudinal member. It is distinguished in that the crossmember has a hollow chamber profile with a hollow chamber which is round at least in sections in cross section, which hollow chamber profile is arranged in a crossmember longitudinal axis running perpendicularly to the vehicle center longitudinal axis.

19 Claims, 10 Drawing Sheets

(56) References Cited

U.S. PATENT DOCUMENTS

2015/0001880 A1* 1/2015 Matsuo .................. B60R 19/18
                                                                      296/187.1
2015/0115572 A1* 4/2015 Kim ...................... B21D 53/88
                                                                      280/500

FOREIGN PATENT DOCUMENTS

| DE | 199 42 073 A1 | 3/2000 |
| DE | 198 49 358 A1 | 5/2000 |

* cited by examiner

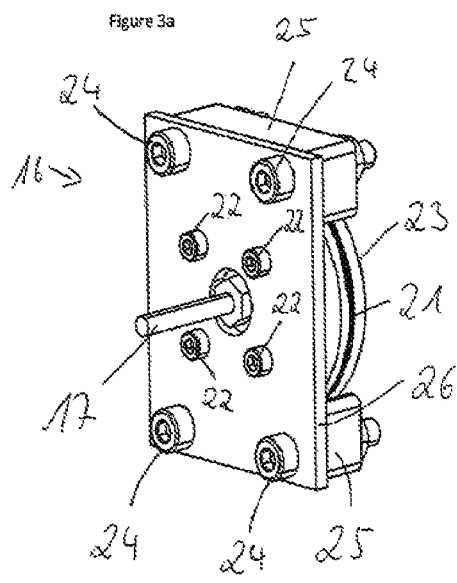
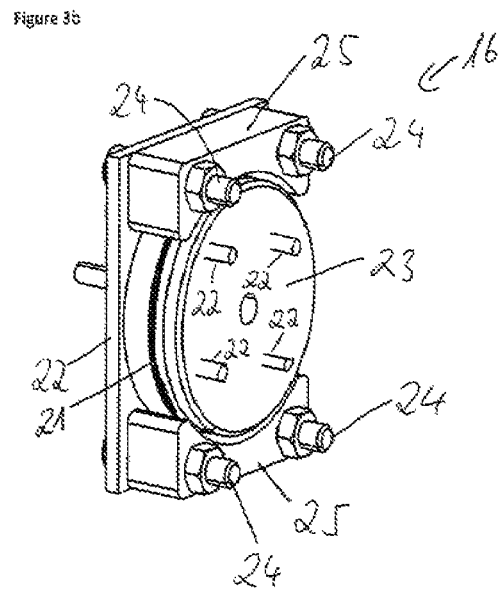
Figure 4
Figure 5
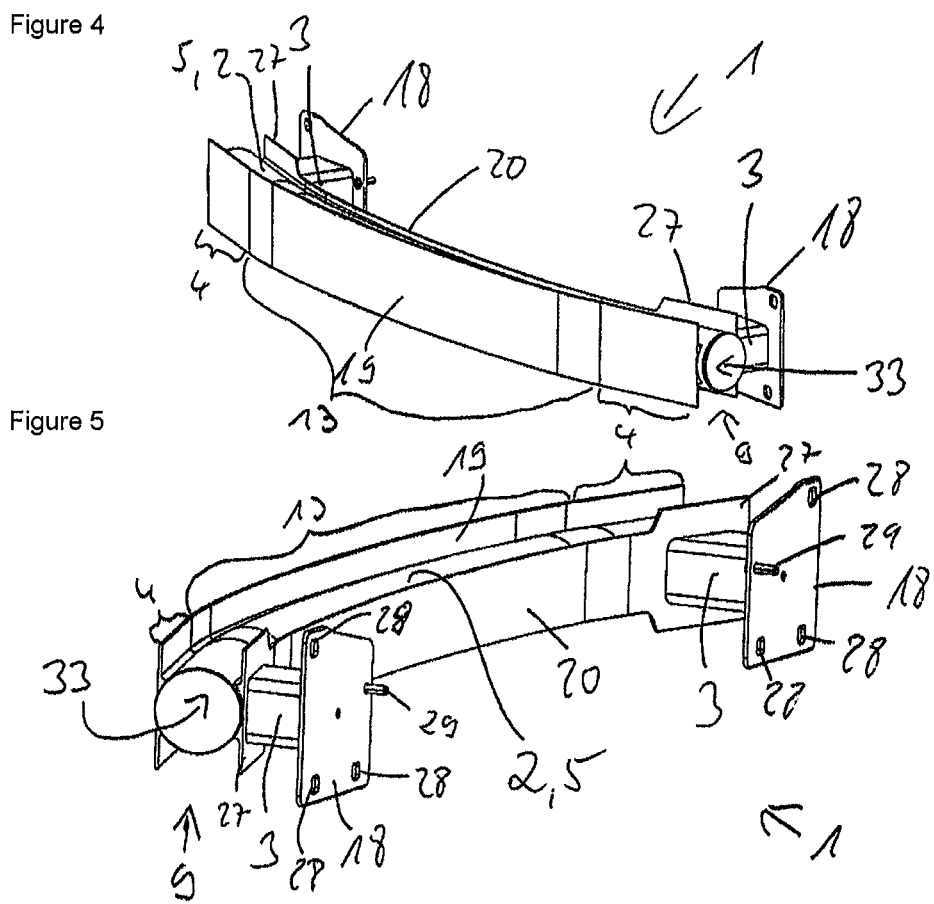

BUMPER ARRANGEMENT

CROSS-REFERENCE TO RELATED APPLICATIONS

This application claims the benefit of German Patent Application No. DE 10 2015 112 935.3, filed Aug. 6, 2015, the entire contents of which are incorporated herein by reference.

FIELD

The invention relates to a bumper arrangement according to the preamble of claim 1.

BACKGROUND

Bumper arrangements of this type are installed in motor vehicles both on the front side and on the rear side in order to absorb or to dissipate the energy from impacts in such a manner that the support structure of the motor vehicle is as far as possible not damaged. A bumper arrangement of this type generally consists of a component, for example a crashbox, converting impact energy into work of deformation, and a crossmember which serves to introduce or to dissipate the energy resulting from a collision into the crashbox.

Bumper arrangements of this type are known for example from DE 10 2009 053 861 A1 and EP 2 318 237 B1. Although, in the case of these bumper arrangements, good dissipation or introduction of energy into the crashboxes and good deformation of the crashboxes in the event of a collision already take place, there continues to be a need for improvement in respect of the energy introduction properties and also in respect of the deformation properties of the bumper arrangement and with regard to the degradation of energy by the bumper crossmember itself.

SUMMARY

It is therefore the object of the invention to develop a bumper arrangement according to the preamble of claim 1 in such a manner that there is improved energy dissipation and reduced load peaks in the crashbox and vehicle body and also improved or more targeted deformation of the bumper arrangement in a crash scenario.

This object is achieved by a bumper arrangement having all of the features of claim 1. Advantageous refinements of the invention are claimed in the dependent claims.

The bumper arrangement according to the invention has a crossmember and two crashboxes, wherein the crashboxes are each connectable on one side to the crossmember on an outer region thereof and are arrangeable on the other side on a vehicle-side longitudinal member. The bumper arrangement according to the invention is now distinguished in that the crossmember has a hollow chamber profile with a hollow chamber which is round at least in sections in cross section, which hollow chamber profile is arranged in a crossmember axis running perpendicularly to the vehicle center longitudinal axis. The refinement according to the invention of the bumper arrangement now makes it possible that, by means of the hollow chamber profile provided with a hollow chamber which is round at least in sections in cross section, even crash load situations of greater severity have the required deformation properties or energy dissipation properties in order to allow the support structure or body not to be damaged in the event of a crash load. In particular, it is possible by means of this refinement of the crossmember to degrade impact energy in the crossmember at the initial stage of a crash situation and thus to reduce load peaks on crashbox and vehicle body. It is advantageous here for the hollow chamber of the hollow chamber profile to have at least in sections on the front side, i.e. on the side facing toward the crashboxes, a cross section which is substantially in the shape of a segment of a circle. Also on the rear side, i.e. on the side facing toward the crashboxes, the hollow chamber of the hollow chamber profile can have a cross section substantially in the shape of a segment of a circle at least in sections. To this extent, hollow chambers which are formed to be circular in cross section at least in sections and with flattened circular cross sections of this type, i.e. only with a front-side and rear-side cross section of the shape of a segment of a circle, are therefore intended to be included according to the invention.

So that energy dissipation or deformation that is uniform as possible can occur on both sides of the bumper arrangement, it has proven successful, in a first refinement of the invention, for the hollow chamber profile to extend substantially over the entire crossmember longitudinal extent and/or to be formed mirror-symmetrically with respect to a plane which runs through the center longitudinal axis of the vehicle and is perpendicular to the carriageway. By this means, it is provided that the bumper arrangement is formed identically both on the left and on the right side of a vehicle, and therefore the same energy dissipation and/or deformation properties arise on both sides of the motor vehicle.

According to a further refinement of the invention, it can be provided that the hollow chamber profile is formed asymmetrically with respect to a plane running through the crossmember longitudinal axis and parallel to the carriageway. This refinement of the invention serves to be able to compensate in particular for a height offset of the crossmember of the bumper arrangement with respect to the longitudinal members on which the crashboxes can be arranged on the vehicle. By this means, it is made possible for the above-described load situations even in the case of bumper arrangements of this type to nevertheless ensure, according to the invention, improved energy dissipation or deformation of the bumper arrangement.

With respect to the energy dissipation into the crashboxes, it has proven particularly advantageous here for the hollow chamber profile to have a circular cross section at least between the outer regions of the crossmember, on which outer regions the crashboxes are arranged. By means of this circular cross section of the hollow chamber profile, it is possible to provide the bumper arrangement with a particularly stable crossmember, with the aid of which energy is dissipated into the crashboxes in a particularly advantageous manner.

However, it has been shown that the buckling resistance can advantageously be increased if the hollow chamber profile has a cross section which is flattened in relation to a circular cross section at least between the outer regions of the crossmember, on which outer regions the crashboxes are arranged. It is particularly advantageous here if the hollow chamber profile continues to have a circular cross section at its ends since such cross sections can be closed in a particularly simple manner in terms of process engineering with corresponding end side elements.

With respect to improved stability of the bumper arrangement or of the crossmember, it has also proven successful for the hollow chamber profile to be designed as a multi-chamber profile. The hollow chamber profile can be subdivided here into a plurality of chambers by the fact that a plurality of chambers are arranged in the hollow chamber profile at least in the vertical direction.

In the same way, the refinement of the invention also aims at providing at least one inner web in the hollow chamber profile. Inner webs of this type likewise increase the stability of the crossmember or of the hollow chamber profile, and therefore the energy dissipation and deformation properties of the bumper arrangement according to the invention are once again also improved as a result. The at least one inner web can also serve here as a partition between the previously described plurality of chambers of a hollow chamber profile designed as a multi-chamber profile.

In order once again to improve the stability of the bumper arrangement and therefore the energy dissipation and deformation properties of the entire bumper arrangement, it is provided that the crossmember is provided in its outer regions with deformation inserts or reinforcing inserts. In addition to these advantages, the effect also achieved by this refinement of the invention is a further integration of functions since, by this means, connections to further elements, such as, for example, a crashbox, a towing attachment, sealing elements and more of the like, can advantageously take place in these regions.

A further improvement in the stability of the bumper arrangement and therefore in the energy dissipation and deformation properties of the entire bumper arrangement is achieved in that the crossmember is provided in its central region lying between the outer regions with at least one reinforcing attachment, reinforcing insert or with an embossing.

According to another concept of the invention, the crossmember and/or the hollow chamber profile are formed in the outer regions of the crossmember with a wall thickness which is reduced in relation to the central region, said wall thickness preferably being reduced by 0.2 mm to 2 mm, and, particularly preferably, said wall thickness reduction extending at least 5 mm to 45 mm from the ends of the crossmember or of the hollow chamber profile into the interior of the hollow chamber. This measure also leads to the energy dissipation and deformation properties of the entire bumper arrangement according to the invention being improved once again. Wall thicknesses of 2.5 mm to 6 mm are advantageous in the central region of the crossmember or of the hollow chamber profile. However, even outer wall thicknesses are predictable which then, however, are associated with an increased weight and therefore with a more unfavorable environmental footprint of a vehicle provided therewith.

According to a further concept of the invention, a towing attachment can also be provided which, preferably in the form of an extruded profile, is adapted to the contour of the crossmember or of the hollow chamber profile, and which is arranged on the hollow chamber profile or the crossmember of the bumper arrangement according to the invention. By this means, it is possible to use the bumper arrangement according to the invention for towing motor vehicles and the like without having to touch the support structure of the motor vehicle.

The hollow chamber profile is preferably closed at its ends, wherein this measure likewise contributes to increased stability of the bumper arrangement according to the invention or to improved energy dissipation or deformation of the bumper arrangement.

According to a particularly advantageous refinement of the invention, end side elements are provided for the end-side closing of the hollow chamber profile. Said end side elements here are essentially designed in such a manner that they securely close the hollow chamber profile at its ends; such a closing can be undertaken here by means of welding or screwing. However, it can also be provided that the end side elements can be screwed onto the hollow chamber profile with an external thread, in particular if the hollow chamber profile still has a circular cross section in its region. Said external thread can correspond here to an already present internal thread of the hollow chamber profile. However, it is also possible for said external thread to cut the inner wall of the hollow chamber of the hollow chamber profile or of the crossmember as it is being screwed on and, in the process, to cut a corresponding internal thread into the hollow chamber profile.

Furthermore, it is also provided here that the hollow chamber profile is closed fluid-tightly, in particular with an internal pressure which is increased in relation to the ambient pressure. Such a fluid-tight closure can take place, for example, in that, firstly, the end side elements are welded all the way around in the end region of the hollow chamber profile. However, it is furthermore also possible for such a fluid-tight closure to be possible by the use of end side elements with plug-in elements. Sealing rings advantageously enclosure said plug-in elements, and therefore fluid-tight closure is made possible as a result. These possibilities are appropriate in a simple manner if the ends of the hollow chamber profile have a circular cross section. However, closure is also possible with different cross sections, wherein, however, an increased technical outlay may have to be made in order to ensure the fluid tightness. In particular, the previously mentioned plug-in elements can also serve as reinforcing elements since the crashboxes, possible towing attachments and more of the like can also be arranged in these regions of the crossmember.

It should also be noted here that fluid can be understood according to the invention as being both a gas and a liquid. In order, however, to reach an internal pressure which is increased in relation to the ambient pressure, when a liquid fluid is used the hollow chamber profile must not be completely filled with the liquid since liquids are as a rule incompressible. To this extent, even when liquids are used as the fluid, a residual region of the hollow chamber profile also always has to be filled with a gaseous medium in order to obtain the internal pressure which is increased in relation to the ambient pressure.

According to a further concept of the invention, the crossmember is produced from an aluminum or a magnesium alloy or from a fiber-filled thermoplastic, in particular by extrusion or pultrusion. Materials of this type satisfy the specifications necessary for the deformation and energy dissipation properties of the entire bumper arrangement.

According to the invention, it can be provided here that the hollow chamber profile is designed as part of the crossmember. In this case, the hollow chamber is produced at the same time during the production of the crossmember, for example when aluminum is extruded.

Furthermore, a front wall and a rear wall can already be arranged on the crossmember, wherein said walls may also be formed integrally with the crossmember. The crashboxes can then be arranged on the rear wall, while corresponding bumper elements can be arranged on the front wall.

However, it can also be provided that a protective element made from an elastomer or a thermoplastic polymer is arranged in the hollow chamber, wherein the protective element has a cavity for receiving a fluid. In particular, a hollow chamber profile of this type can also contain at least one injected, injection molded or extruded plastics liner.

The bumper arrangement according to the invention can be designed here in such a manner that the internal pressure in the hollow chamber is increased by at least 1.5 bar, preferably at least 5 bar, in relation to the external pressure. However, it is provided in particular, in order to obtain the desired deformation and energy dissipation properties of the bumper arrangement according to the invention, to keep the internal pressure in the hollow chamber profile above the ambient pressure by 10 bar to 40 bar. The energy introduction or dissipation properties and the deformation properties in the bumper arrangement according to the invention are also improved in the event of a crash by this means without the support structure of the motor vehicle provided with at least one bumper arrangement according to the invention being damaged. Furthermore, a hollow chamber of the hollow chamber profile or of the crossmember can also be used as a container for liquid or gaseous operating media of a motor vehicle.

Furthermore, the crossmember can have a substantially flat rear wall facing the crashboxes and a front wall facing away from the crashboxes. Crossmembers of this type can be produced integrally from aluminum or an aluminum alloy in a simple manner by extrusion.

According to a further advantageous refinement of the invention, the crossmember or the hollow chamber profile, in its outer regions, has a flat surface, preferably in the form of a flange, as part of the rear wall. A crashbox can be connected to a flange-shaped surface of this type in a simple manner.

So that closure means, such as, for example, the previously mentioned end side elements, can be easily fastened to the crossmember or to the hollow chamber profile, connection elements for the fastening of closure means are attached to the crossmember or to the hollow chamber profile at its ends by welding.

Further aims, advantages, features and use possibilities of the present invention emerge from the description below of exemplary embodiments with reference to the drawings. All of the features described and/or illustrated pictorially form the subject matter of the present invention by themselves or in any expedient combination, also irrespective of the summary thereof in the claims or the dependency reference thereof.

BRIEF DESCRIPTION OF THE DRAWINGS

FIGS. 4 and 5 show an exemplary embodiment of a further bumper arrangement according to the invention.

DETAILED DESCRIPTION

Figure 1:
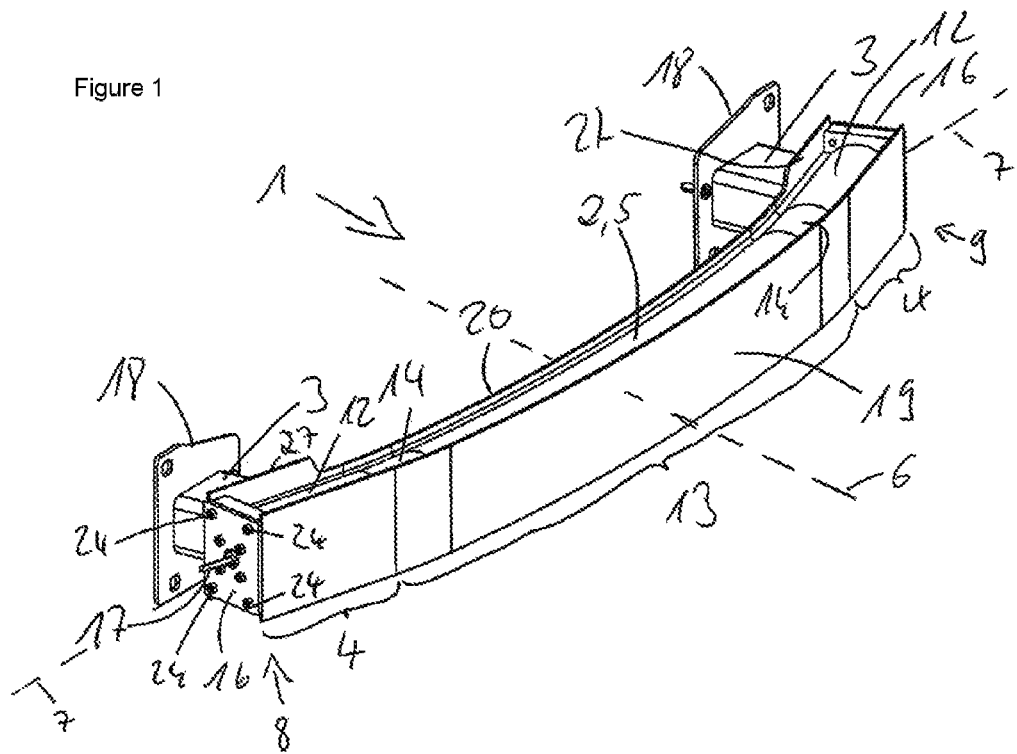
FIG. 1 shows an exemplary embodiment of a bumper arrangement according to the invention in a perspective view.

FIG. 1 illustrates a first exemplary embodiment of a bumper arrangement 1 according to the invention. The latter substantially consists of a crossmember 2 which is produced here as a hollow chamber profile 5 integrally and uniformly in terms of material from an aluminum alloy or a magnesium alloy by extrusion and is in each case connected in its outer regions 4 to a corresponding crashbox 3 via a rear wall 20 which is provided with a flat, flange-shaped surface 27 for this purpose in said outer regions 4. At their other end, the crashboxes 3 here have flanges 18 with which the bumper arrangement 1 can be fastened to corresponding longitudinal members (not illustrated here) or flange plates of the longitudinal members of a motor vehicle.

The bumper arrangement 1 is arranged here in a motor vehicle in such a manner that a crossmember longitudinal axis 7 is perpendicular to a center longitudinal axis 6 of the vehicle.

The crossmember 2 which is designed as the hollow chamber profile 5 has end side elements 16 at its ends 8 and 9, with which a hollow chamber 33 (indicated in FIG. 2) of the hollow chamber profile 5 or of the crossmember 2 can be sealed fluid-tightly in relation to the surroundings.

On that side of the crossmember 2 which lies opposite the rear wall 20, said crossmember has a front wall 19 which is flat, as viewed in the vertical direction, and on which pedestrian protective elements (not illustrated here) or the like can be arranged.

So that the internal pressure in the hollow chamber 33 of the hollow chamber profile 5 or of the crossmember 2 can be varied, the end side elements 16 have removal devices 17, with the aid of which fluid can be removed from the hollow chamber 33 of the hollow chamber profile 5 or of the crossmember 2. On the other hand, it is also possible to transfer fluid in the hollow chamber 33 of the hollow chamber profile 5 or of the crossmember 2 via said removal devices 17.

Here and below, fluid is intended to be understood as meaning both gaseous and liquid media. So that, however, a positive pressure can be produced within the hollow chamber 33 of the hollow chamber profile 5 or of the crossmember 2, when a liquid fluid is used it should be noted that the entire hollow chamber should not be filled with the liquid since, because of the incompressibility of liquids, the positive pressure could then not be achieved in relation to the ambient pressure.

Figure 2:
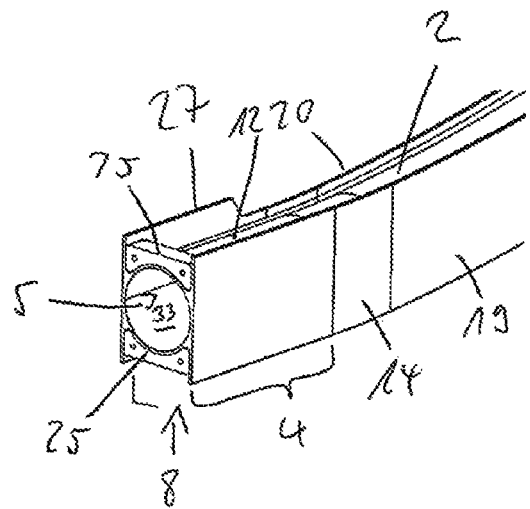
FIG. 2 shows a detailed illustration of FIG. 1, FIGS. 3a and 3b show a possible embodiment of end side elements for closing the ends of a hollow chamber profile, in various views.

FIG. 2 now shows a detailed illustration of the bumper arrangement 1 according to the invention from FIG. 1 in the region of the end 8 of the crossmember 2 designed as a hollow chamber profile 5. In this illustration, the hollow chamber 33 of the hollow chamber profile 5 or of the crossmember 2 is not yet closed with the end side element 16. However, connecting elements 25 with which the corresponding end side element 16 can be arranged fluid-tightly on the hollow chamber profile 5 of the crossmember 2 by means of screws 24 can be seen in this illustration. Furthermore, this illustration also does not show the crashbox 3 which is connected to the crossmember 2 via the rear wall 20 thereof.

FIGS. 3a and 3b now show a detailed illustration of an end side element 16 in a perspective view from the front and from the rear. A plate 26 on which and to which a plug-in element 23 is arranged and fastened by means of screws 22 can clearly be seen here. Furthermore, the position of the connection elements 25 in the fitted position is indicated here. The screws 24 serve to fasten the entire end side element 16 to the connection elements 25 of the crossmember 2 according to FIG. 2. In this exemplary embodiment, the plug-in element 23 is of circular design and is therefore suitable for closing the opening in the hollow chamber 33 of the hollow chamber profile 5 or of the crossmember 2 in the end region 8 according to FIG. 2. So that a fluid-tight closure can be ensured, said plug-in element 23 is provided with an encircling sealing ring 21.

Furthermore, the removal device 17, which can be designed as a valve, can also be clearly seen in these illustrations. With the aid of said removal device 17, it is possible to remove fluid from the hollow chamber 33 of the hollow chamber profile 5 or of the crossmember 2. However, it is also possible to supply fluid to the hollow chamber 33 of the hollow chamber profile 5 or of the crossmember 2 via said removal device.

FIGS. 4 and 5 show the bumper arrangement according to the invention according to FIG. 1 in a different illustration. The connection elements 25 of the crossmember 2 are not illustrated here. However, the flanges 18 of the crashboxes 3 and how the latter can be arranged with screws (not illustrated here) via openings 28 and with a positioning element 29 on a corresponding longitudinal member of the vehicle can clearly be seen in this illustration.

FIGS. 6 to 15 now show various bumper arrangements according to the invention in cross-sectional illustrations in the region of a crashbox 3.

Figure 6:
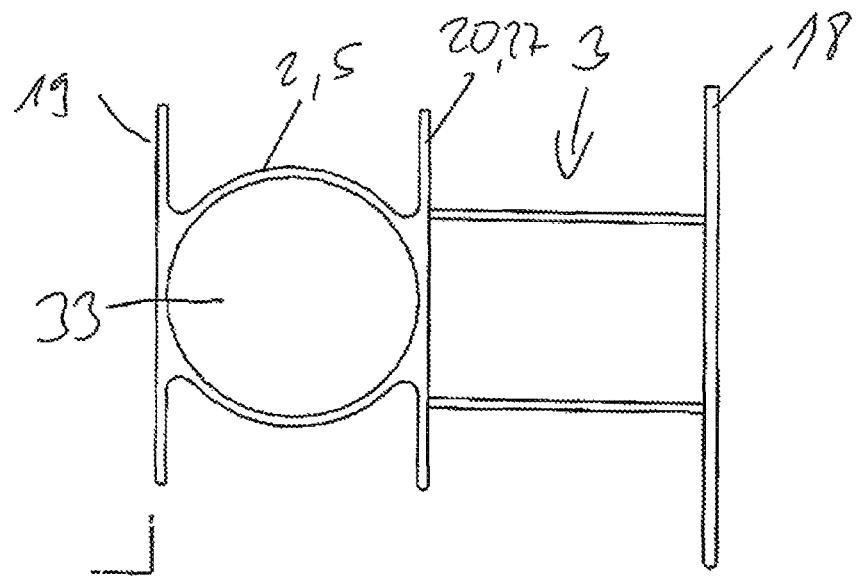
FIGS. 6 to 15 show various embodiments of a bumper arrangement according to the invention in the region of a crashbox, in a cross-sectional illustration.

The exemplary embodiment of FIG. 6 has a crossmember 2 which is designed as a hollow chamber profile 5 and has a hollow chamber 33 with a circular cross section. On the front side, the crossmember 2 here has a front wall 19, while a rear wall 20 is provided on the rear side. A crashbox 3 is arranged on the rear wall 20 via the flange-shaped, flat surface 27, said crashbox being provided in turn on the other side with a flange 18 with which the entire bumper arrangement according to the invention can be arranged on a longitudinal member of a motor vehicle. The wall thicknesses of the different regions of the crossmember 2 likewise differ. While the rear wall has a wall thickness of 2.5 mm to 4 mm, the front wall 19 has a wall thickness of 3 mm to 4 mm. The wall thickness of the crossmember 2 normally has a thickness of 3 mm to 6 mm. However, it can be provided that a wall thickness reduction of the crossmember has been introduced at the ends 8 and 9 of the hollow chamber profile 5 by machining when corresponding closure elements with a corresponding external thread cut a corresponding internal thread into the crossmember 2 or into the hollow chamber profile 5 in the circular opening at the ends 8 and 9.

Figure 7:
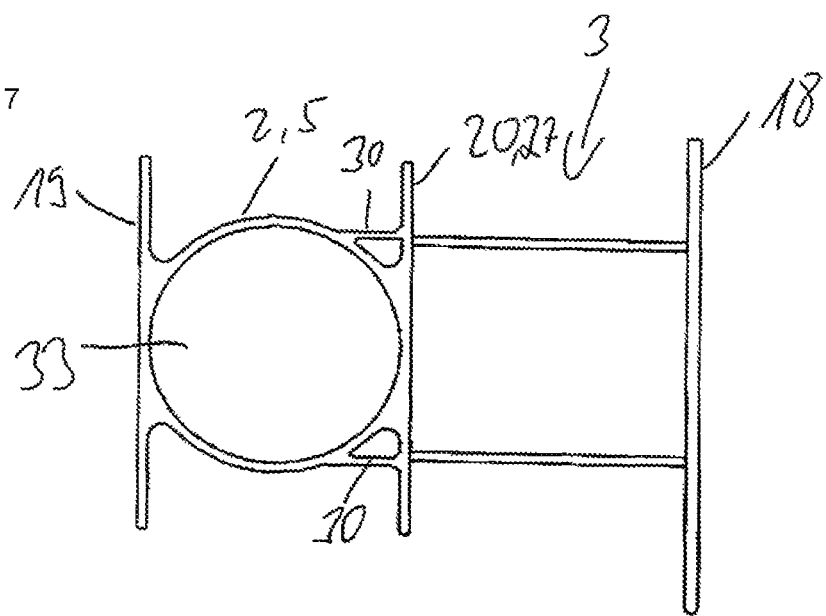

The exemplary embodiment of FIG. 7 substantially corresponds to that of FIG. 6, wherein, however, additional supports 30 are arranged between the rear wall 20 of the crossmember 2 and the crossmember 2 in order to reinforce the entire bumper arrangement. The wall thicknesses can be designed here corresponding to the wall thicknesses of the exemplary embodiment according to FIG. 6. As a result, the force flux from the crossmember 2 to the crashboxes 3 is optimized.

Figure 8:
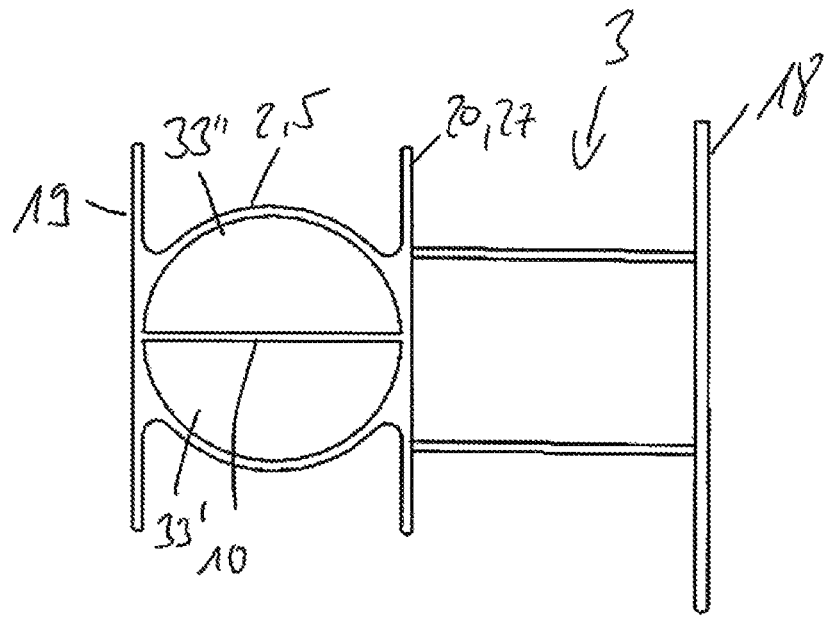
Figure 9:
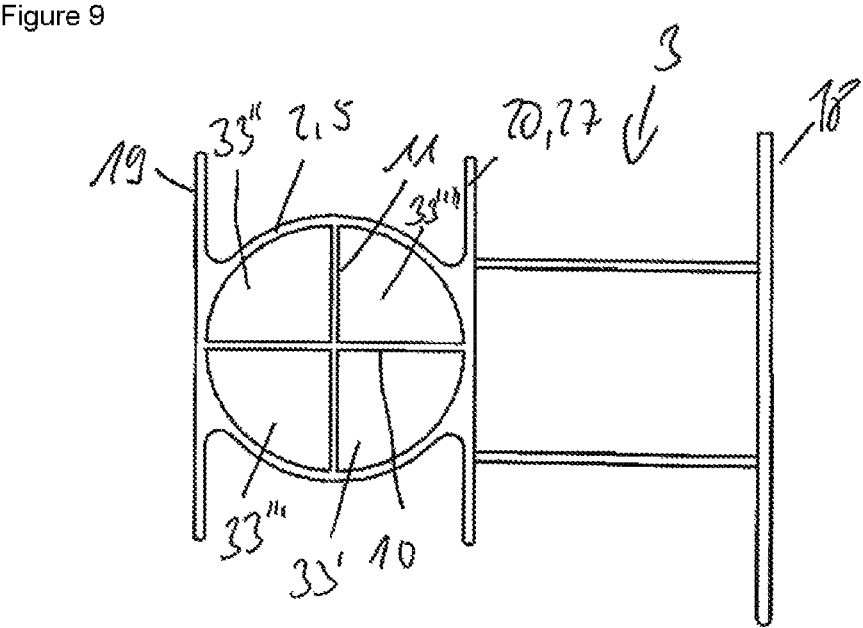

The exemplary embodiments of FIGS. 8 and 9 also substantially correspond to that of FIG. 6. However, in the exemplary embodiment of FIG. 8, an inner web 10 is provided in this case in order to reinforce the entire bumper arrangement. If said connecting web 10 passes through the entire hollow chamber profile 5, the hollow chamber profile 5 is designed as a two-chamber profile with two hollow chambers 33' and 33". In the case of such a hollow chamber profile 5 with two hollow chambers 33' and 33", it would be possible to fill the different hollow chambers 33' and 33" with different pressures. This may be expedient for specific applications in order to optimize certain energy dissipation properties.

In the exemplary embodiment of FIG. 9, in addition to the inner web 10, a further inner web 11 is arranged in the hollow chamber profile 5. Said inner web 11 also serves primarily to reinforce the entire bumper arrangement. If, however, this inner web 11 also passes completely through the hollow chamber profile 5, the hollow chamber profile 5 becomes a four-chamber profile with four hollow chambers 33', 33", 33''' and 33''''. It would also be possible in turn here to fill the different hollow chambers 33', 33", 33''' and 33'''' with different pressures.

Figure 10:
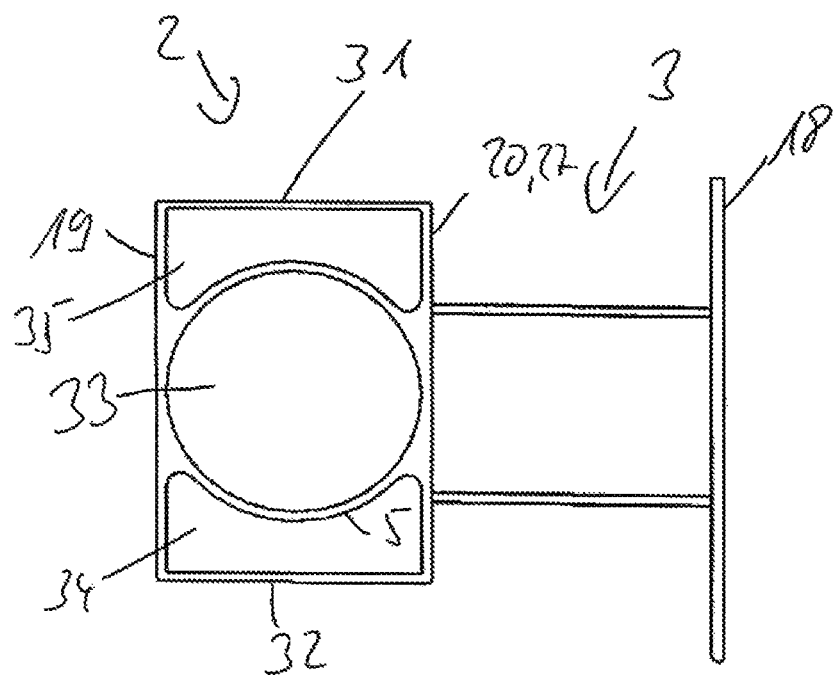

In the exemplary embodiment according to FIG. 10, the crossmember 2 is now formed as a rectangle with an upper wall 31 and a lower wall 32 that connect the front wall 19 to the rear wall 20 of the crossmember 2. A cross-sectionally circular hollow chamber profile 5 with a hollow chamber 33 is arranged within the crossmember 2. A further hollow chamber 35 is now also formed between the hollow chamber profile 5 and the upper wall 31. A further hollow chamber 34 is now also formed between the hollow chamber profile 5 and the lower wall 32.

Figure 11:
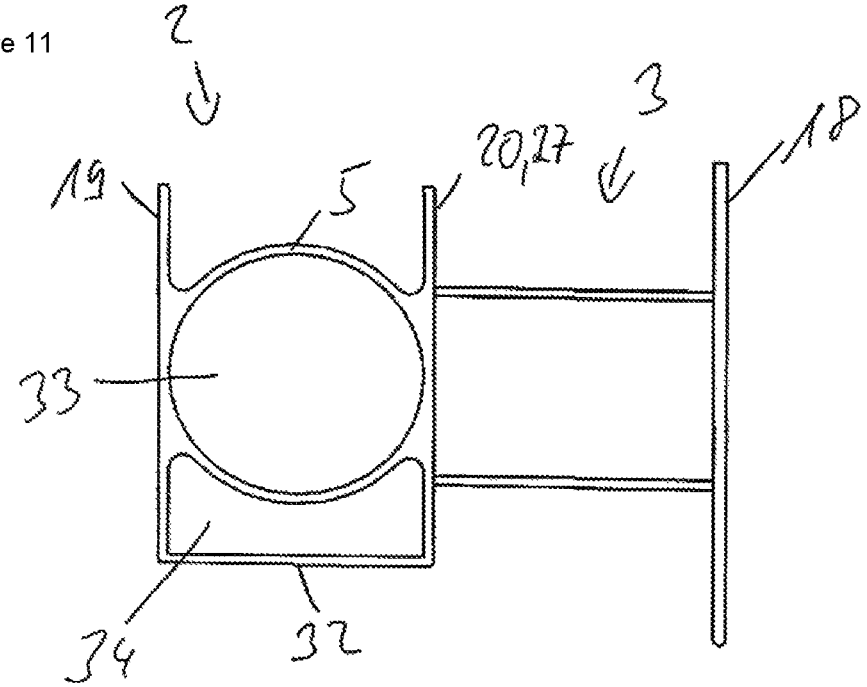

In the exemplary embodiment according to FIG. 11, the crossmember 2 is of U-shaped design with a front wall 19, a lower wall 32 and a rear wall 20, wherein a hollow chamber profile 5 with a circular cross section is furthermore arranged in the crossmember 2. A further hollow chamber 34 is now also formed between the hollow chamber profile 5 and the lower wall 32.

Figure 12:
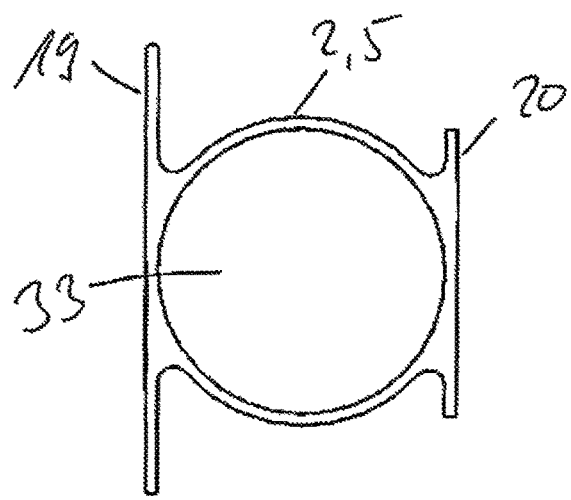
Figure 13:
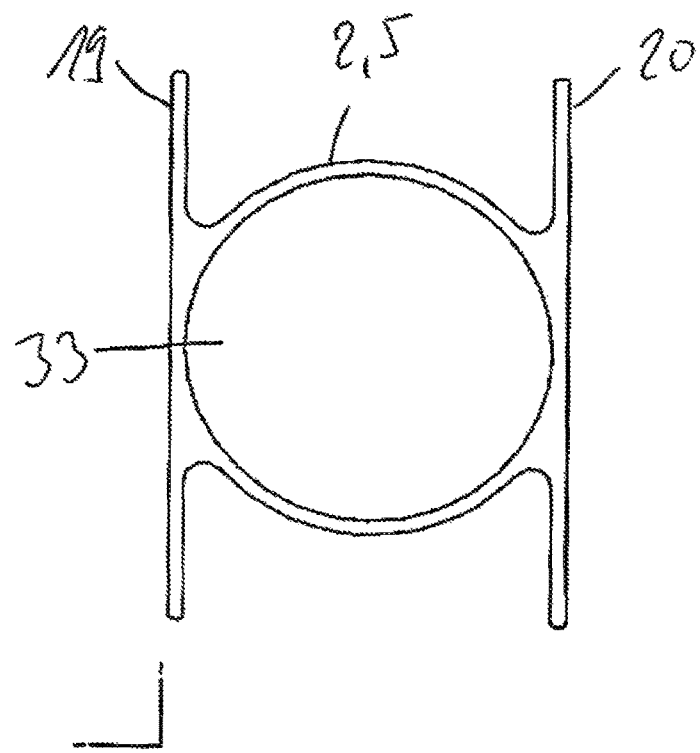

FIGS. 12 and 13 show crossmembers 2 which are designed as a hollow chamber profile 5 with a hollow chamber 33 and have different front walls 19 and rear walls 20. Whereas, in the exemplary embodiment according to FIG. 13, the front wall 19 and the rear wall 20 extend approximately in the same way over the crossmember 2 designed as a hollow chamber profile 5, the rear wall 20 of the crossmember 2 is shortened in relation to the front wall 19, according to the exemplary embodiment of FIG. 12.

Figure 14:
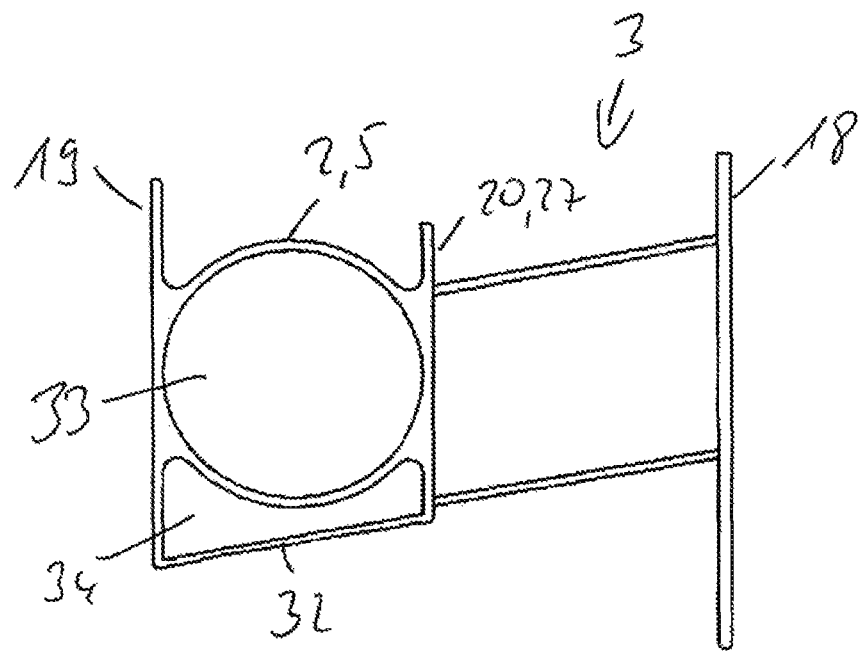
Figure 15:
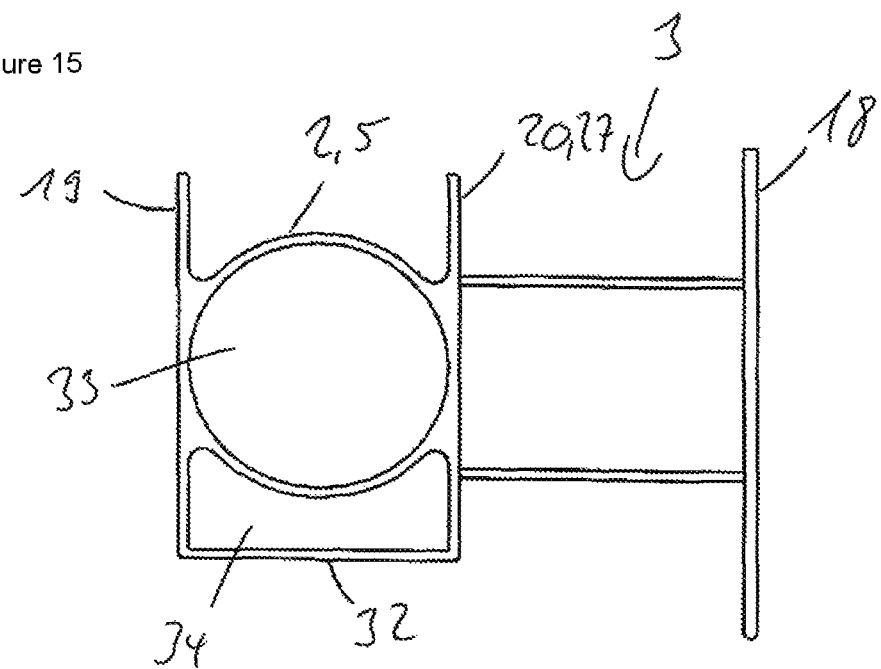

A crossmember 2 provided with a shortened rear wall 20 is also used in the exemplary embodiment according to FIG. 14. However, in this exemplary embodiment, the rear wall 20 of the crossmember 2 is connected again to the front wall 19 via a lower wall 32. The entire crossmember 2 therefore forms a two-chamber profile with two hollow chambers 33 and 34, wherein the hollow chamber 33 is formed by the hollow chamber profile 5, and a hollow chamber 34 is formed by the lower wall 32 and the hollow chamber profile 5. In the exemplary embodiment according to FIG. 14, the crossmember 2 is also arranged in a height-offset manner in relation to the longitudinal member, to which the entire bumper arrangement is secured by means of the flange 18 of the crashbox 3, wherein the crashbox 3 and the lower wall 32 are each oriented at an angle of less than 90° with respect to the flange 18. A corresponding exemplary embodiment according to FIG. 14, but without a height offset, is illustrated in FIG. 15. Two hollow chambers 33 and 34 are correspondingly also realized here by the configuration there.

Figure 16:
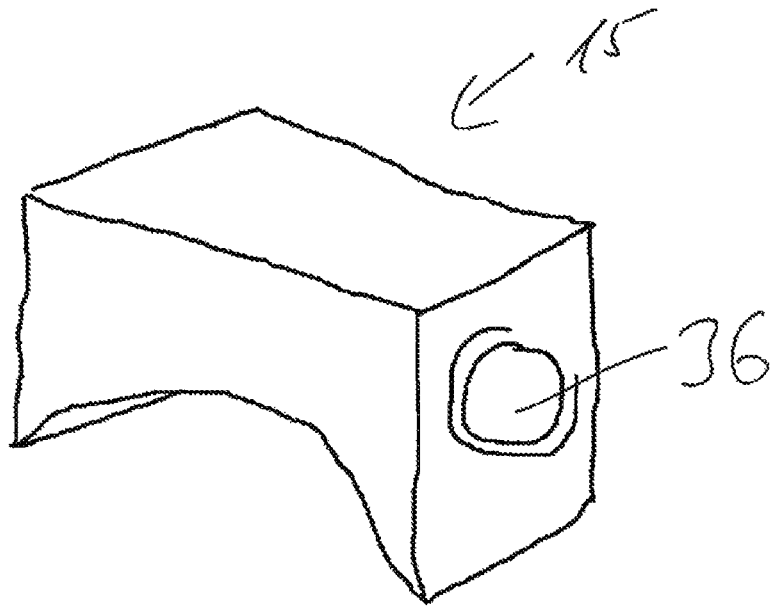
FIG. 16 shows an embodiment of a towing attachment for connection to a bumper arrangement according to the invention, in a perspective illustration.

FIG. 16 now shows a possible design for a towing attachment 15 which can be arranged on a bumper arrangement according to the invention, for example in the outer region 4 of the crossmember 2. The towing attachment 15 has a thread receiver 36 for a threaded lug (not illustrated here). The towing attachment 15 can be connected here firstly to the crossmember 2 or to the hollow chamber profile 5 and secondly also to the rear wall 20 and the front wall 19 by connecting technology, for example by screwing or welding to the bumper arrangement according to the invention. The towing attachment is extruded here in such a manner that it is adapted to the shape of the crossmember 2 in the region of the fastening thereof.

Figure 17:
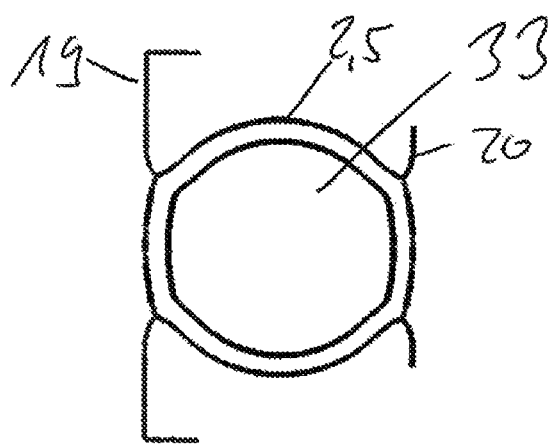
FIG. 17 shows a cross-sectional illustration of a possible embodiment of a bumper arrangement according to the invention.

FIG. 17 now illustrates an exemplary embodiment of a crossmember 2 of a bumper arrangement according to the invention. This crossmember is also designed here as a hollow chamber profile 5 with a hollow chamber 33. However, the front wall 19 there is designed as a bent-over front flange. In addition, the cross section of the hollow chamber profile 5 in this exemplary embodiment is not circular, but is somewhat flattened.

Figure 18:
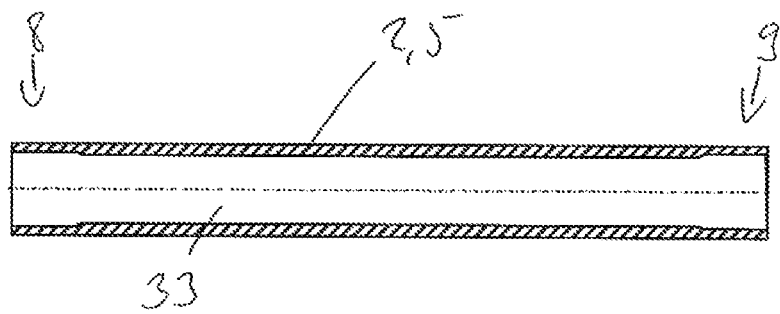
FIGS. 18 to 20 show various embodiments of a crossmember of a bumper arrangement according to the invention, in a cross-sectional illustration.
Figure 19:
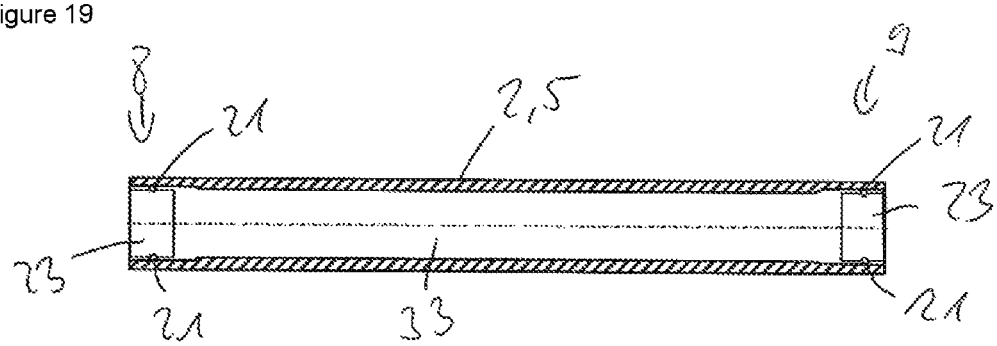
Figure 20:
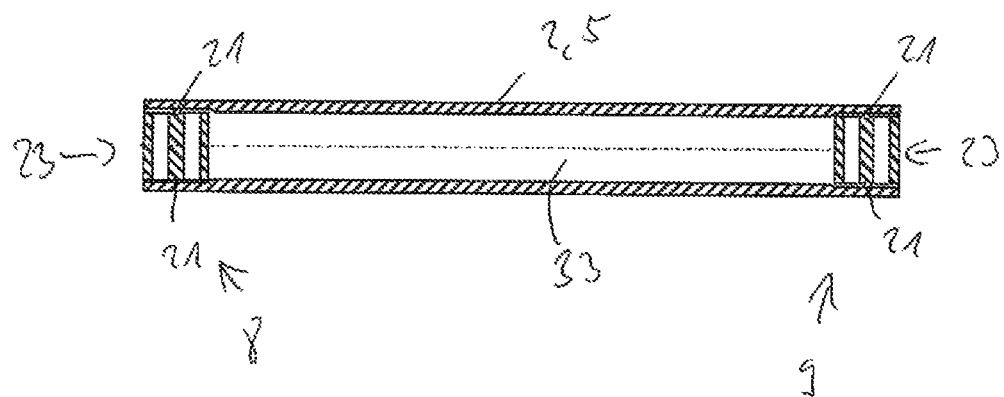
Figure 21:
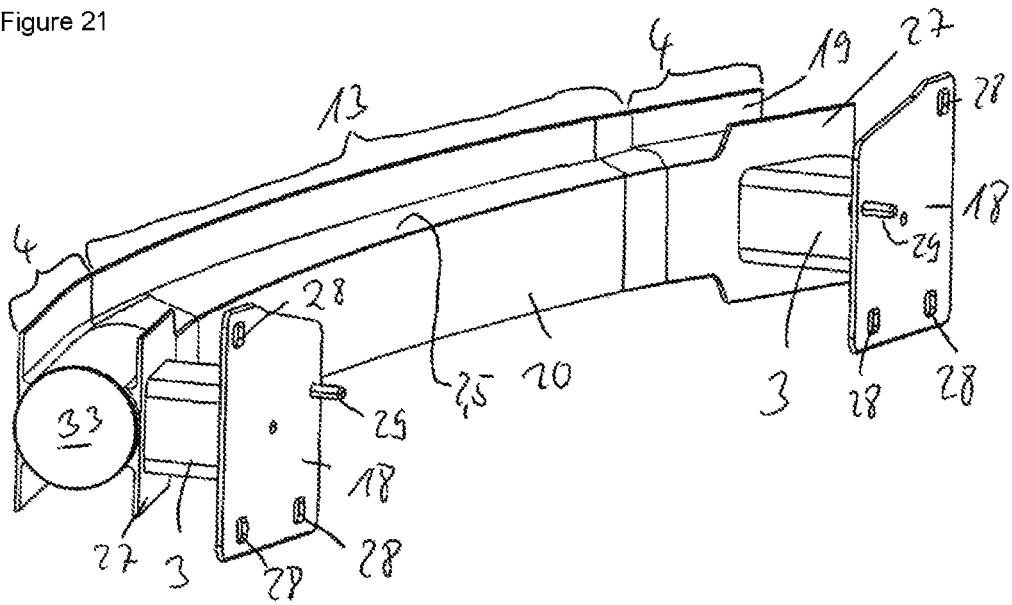
FIGS. 21 to 24 show a further possible embodiment of a bumper arrangement according to the invention, in various illustrations.
Figure 22:
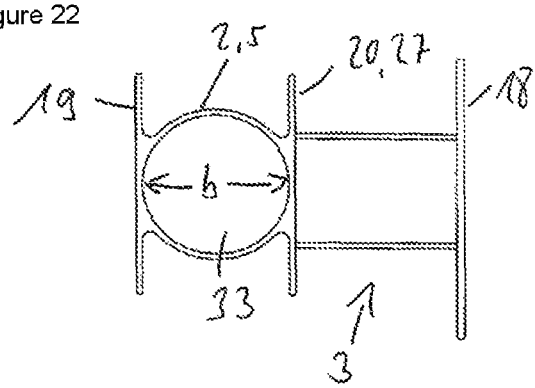

FIGS. 18 to 20 now show different longitudinal sections of crossmembers 2, which have a hollow chamber 33 and are in the form of a hollow chamber profile 5, in an illustration without a curvature. The ends 8, 9 of said crossmembers 2 which are in the form of a hollow chamber profile 5 are formed with a thinner wall than the rest of the hollow chamber profile 5. The ends 8 and 9 of the hollow chamber profile 5 can extend here over a length of 5 mm up to 45 mm. Said thinner-walled design is achieved in that the respective crossmember 2 has been machined from the inside. This machining realizes a neater surface for rubber contact when sealing with a plug-in element 23, as is shown for example in FIGS. 3a and 3b. In such a refinement, a sealing ring 21 which is arranged on the plug-in element 23 can fluid-tightly seal the hollow chamber 33 of the crossmember 2 in the form of a hollow chamber profile 5. In the end regions 8 and 9, the crossmember 2 therefore has a wall thickness which is reduced by 5% to 15% in relation to the remaining wall thickness.

A corresponding illustration with plugged-in plug-in element 23 is shown in FIG. 19. The sealing ring 21 which lies against both the plug-in element 23 and against the inner wall of the crossmember 2 in the form of a hollow chamber profile 5 and therefore seals the hollow chamber 33 fluid-tightly can also be seen particularly readily here.

FIG. 20 now shows an exemplary embodiment in which the ends 8, 9 are provided with a ribbed insert which additionally acts as a deformation element. In the case of a necessary closure, in particular fluid tight closure, a radial groove with a sealing ring 21 can furthermore be provided.

Figure 23:
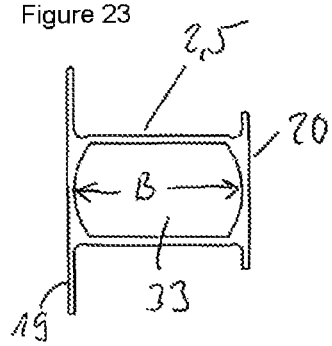
Figure 24:
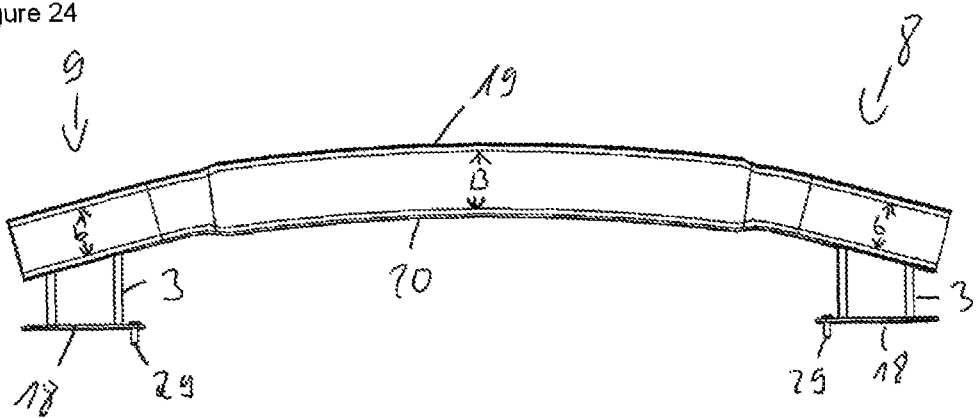

Finally, FIGS. 21 to 24 show a further exemplary embodiment of a bumper arrangement according to the invention in various illustrations. In contrast to the exemplary embodiment according to FIG. 1, this exemplary embodiment has a crossmember 2 which does not have the same cross section over its entire longitudinal extent. While the crossmember 2 continues to have a circular cross section in its outer regions 4, according to FIG. 22, it is flattened in its central region 13, as illustrated in FIG. 23. This has the result that the hollow chamber 33 has a smaller width b in the outer region 4 of the crossmember 2 than the width B in the central region 13 of the crossmember 2. Said larger width B in the central region 13 is caused by the fact that the flattening of the crossmember 2 and therefore of the hollow chamber 33 of the hollow chamber profile 5 is carried out mechanically. In addition, in contrast to the exemplary embodiment of FIG. 1, the bumper arrangement is not closed at the ends. The crossmember 2 is extruded integrally and from the same material in the form of a hollow chamber profile 5 with the hollow chamber 33 being formed.

LIST OF REFERENCE SIGNS

1 Bumper arrangement
2 Crossmember
3 Crashbox
4 Outer region
5 Hollow chamber profile
6 Central longitudinal axis of the vehicle
7 Crossmember longitudinal axis
8 End
9 End
10 Inner web
11 Inner web
12 Reinforcing inserts
13 Central region
14 Reinforcing attachment
15 Towing attachment
16 End side element
17 Removal device
18 Flange
19 Front wall
20 Rear wall
21 Sealing ring
22 Screw
23 Plug-in element
24 Screw
25 Connection element
26 Plate
27 Surface
28 Opening
29 Positioning element
30 Additional support
31 Upper wall
32 Lower wall
33 Hollow chamber
33' Hollow chamber
33" Hollow chamber
33''' Hollow chamber
33'''' Hollow chamber
34 Hollow chamber
35 Hollow chamber
36 Thread receiver
b Width
B Width

What is claimed is:

1. A bumper arrangement, comprising:
a crossmember;
two crashboxes, wherein the crashboxes are connected to opposite end regions of the crossmember, wherein the crossmember has a hollow chamber profile that is round at least in sections in cross section, and wherein the hollow chamber profile is arranged in a crossmember longitudinal axis running perpendicularly to the vehicle center longitudinal axis; and
first and second plug in elements, wherein at least a portion of the first plug in element is received within the hollow chamber profile at a first end of the crossmember,
wherein at least a portion of the second plug in element is received within the hollow chamber profile at a second end of the crossmember, wherein the plug in elements and the crossmember define a closed volume, wherein the crossmember has a substantially flat rear wall facing the crashboxes and a flat front wall facing away from the crashboxes, and wherein the front wall and the rear wall are formed integrally with the crossmember.

2. The bumper arrangement as claimed in claim 1, wherein the hollow chamber profile extends substantially over the entire crossmember longitudinal extent.

3. The bumper arrangement as claimed in claim 1, wherein the hollow chamber profile is formed asymmetrically with respect to a plane running through the crossmember longitudinal axis and parallel to a carriageway.

4. The bumper arrangement as claimed in claim 1, wherein the hollow chamber profile has a circular cross section at least between outer regions of the crossmember.

5. The bumper arrangement as claimed in claim 1, wherein the hollow chamber profile has a flattened cross section at least between outer regions of the crossmember.

6. The bumper arrangement as claimed in claim 1, wherein the hollow chamber profile is extruded and includes a multi-chamber profile.

7. The bumper arrangement as claimed in claim 1, wherein at least one inner web is provided in the hollow chamber profile.

8. The bumper arrangement as claimed in claim 1, wherein the crossmember is provided in its outer regions with at least one of deformation inserts or reinforcing inserts, and is provided in its central region lying between the outer regions with at least one of a reinforcing attachment, a reinforcing insert, and an embossing.

9. The bumper arrangement as claimed in claim 1, wherein the hollow chamber profile is formed in the outer regions of the crossmember with a wall thickness that is reduced in relation to the central region, said wall thickness being reduced by 0.2 mm to 2 mm and said wall thickness reduction extending at least 5mm to 45 mm from the ends of the crossmember or of the hollow chamber profile into the interior of the hollow chamber.

10. The bumper arrangement as claimed in claim 1, wherein a towing attachment is provided in the form of an extruded profile and is adapted to the contour of the crossmember.

11. The bumper arrangement as claimed in claim 1, wherein the hollow chamber profile is closed at its ends.

12. The bumper arrangement as claimed in claim 1, wherein the hollow chamber profile is closed fluid-tightly, in particular with an internal pressure which is increased in relation to the ambient pressure.

13. The bumper arrangement as claimed in claim 1, wherein, in order to remove a fluid received in the hollow chamber profile, at least one removal device is provided.

14. The bumper arrangement as claimed in claim 1, wherein the crossmember is produced from steel, from an aluminum or a magnesium alloy or from a fiber-filled thermoplastic.

15. The bumper arrangement as claimed in claim 1, wherein a protective element made from an elastomer or a thermoplastic polymer is arranged in the hollow chamber, wherein the protective element has a cavity for receiving a fluid.

16. The bumper arrangement as claimed in claim 1, wherein the crossmember or the hollow chamber profile, in its outer regions, has a flat surface, preferably in the form of a flange.

17. The bumper arrangement as claimed in claim 1, wherein connection elements for the fastening of closure means are attached to the crossmember or to the hollow chamber profile at its ends by welding.

18. The bumper arrangement as claimed in claim 1, wherein the hollow chamber profile is formed mirror-symmetrically with respect to a plane which runs through the vehicle longitudinal axis and is perpendicular to a carriageway.

19. The bumper arrangement as claimed in claim 13, wherein the at least one removal device is a valve.

* * * * *